United States Patent [19]

Adams

[11] 3,817,628

[45] June 18, 1974

[54] REFLECTOMETER FOR ON-LINE ANALYSIS OF GRANULAR POWDERS

[75] Inventor: Jim Mills Adams, West Caldwell, N.J.

[73] Assignee: Hoffmann-LaRoche Inc., Nutley, N.J.

[22] Filed: Aug. 17, 1972

[21] Appl. No.: 281,356

[52] U.S. Cl. .............................. 356/210, 356/212
[51] Int. Cl. ......................................... G01n 21/48
[58] Field of Search ...................... 356/71, 209–212, 356/236

[56] References Cited
UNITED STATES PATENTS 3,328,587 6/1967 Brown et al. .................. 356/210 X
3,679,314 7/1972 Mustert ............................... 356/71

Primary Examiner—Ronald L. Wibert
Assistant Examiner—F. L. Evans
Attorney, Agent, or Firm—Samuel L. Welt; Jon S. Saxe; Mark L. Hopkins

[57] ABSTRACT

A method and apparatus for analyzing visible reflectance data of a granular crystalline powder sample in a solid state relative to reflectance data for a reference specimen, by minimizing the effects of the powder particle size on the measurement of the sample optical properties comprising, an optical assembly for deriving sample reference reflectance data, effecting standardization of the sample reflectance data relative to the reference reflectance data by a ratio comparison, and processing the standardized signals effected to establish an output indicator signal representative of the sample optical properties for ascertaining the degrees of presence/absence of the optical quality to be measured.

7 Claims, 2 Drawing Figures 3,817,628

REFLECTOMETER FOR ON-LINE ANALYSIS OF GRANULAR POWDERS

BACKGROUND OF THE INVENTION

The present invention relates to the analysis of ultraviolet and/or optical properties of solids such as granular crystalline powders and in particular to the analysis of the diffuse reflectance spectra of such solids.

In the prior art, analysis of granular crystalline powders for detecting impurities or other purposes has historically been effected by sampling techniques whereby the solid is first dissolved in a solution for subsequent absorption spectrophotometric analysis. Such a technique is, of course, not only cumbersome but is quite time consuming. Other approaches are the use of visual colorimetric tests which require the process chemist to frequently abandon other more fruitful endeavors.

Nevertheless, such data is often desirable in monitoring granular crystalline powders, especially where such data is useful to form the basis for rejection criteria where it is important that the particular product having defects may be rejected or otherwise acted upon. One such criterion is color which might be employed to ascertain the whiteness and purity of the product. Such measurements also have additional value in that they can be related to the chemical stability of the product.

SUMMARY OF THE INVENTION

The purpose of the present invention is to provide an automatic continuous analysis of reflectance data of a granular crystalline powder sample to minimize the effects of the powder particle size on measurement of the sample optical properties. This is accomplished by first standardizing the reflectance values of the granular crystalline powder relative to a reference reflectance value at each of at least three different wavelengths in the region from the ultraviolet to the visible spectrum. The standardized signals representing the diffuse reflectance of the specimen at two wavelengths, are operated upon with analog circuitry to develop a difference signal representative of the sample's optical properties. Depending upon the wavelength area(s) of interest which would be revealing of the optical property desired, a third optical channel might be established to monitor a third spectrum region whereby the reflectance values of the second and third are averaged and their difference from the first then sought.

DESCRIPTION OF THE PREFERRED EMBODIMENT

In the present embodiment the type of granular crystalline powder to be analyzed is ascorbic acid and the optical properties to be monitored are indicative of its color and the concentration of certain impurities. The studies with ascorbic acid have disclosed that reflectance values in the 340–450 nm wavelength range are useful for discerning solid product quality parameters such as whiteness and stability. The reflectance in this range is especially sensitive to the presence of organic impurities in the product. With this knowledge, two spectral bandpass regions within this range, denoted as $\lambda_1$ and $\lambda_2$, were selected to implement the present invention. A third spectral bandpass region $\lambda_3$, chosen as a base is selected far enough into the red spectral region that it is virtually insensitive to the presence of any product impurities.

Figure 1:
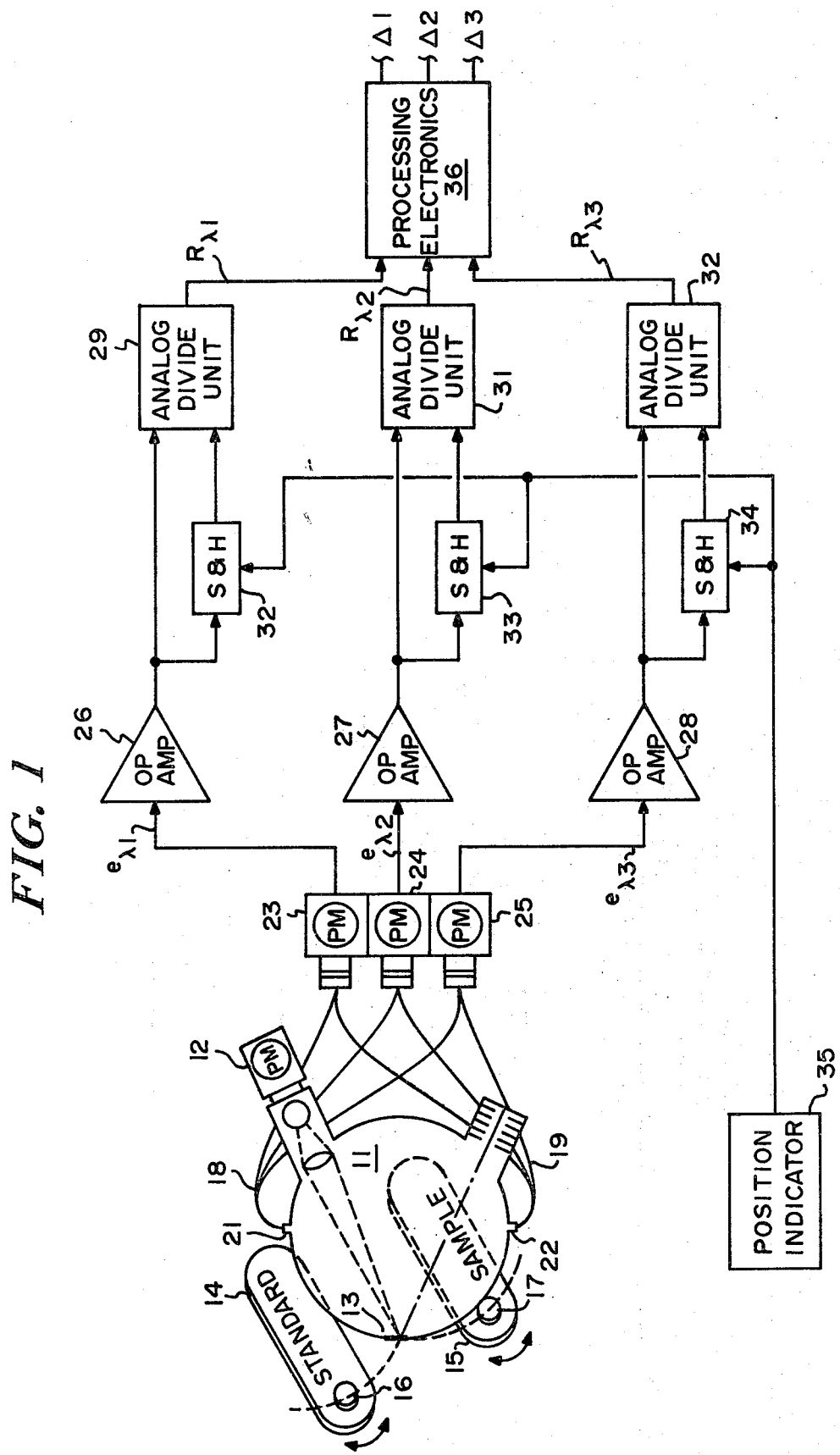
FIG. 1 illustrates diagrammatically a preferred embodiment of the invention.

With reference to the drawings there is shown in FIG. 1 a reflectometer optical assembly comprising an integrating sphere 11, a light source 12, such as a quartz-iodine lamp, and an aperture specimen station 13 to accommodate sample and reference specimens selectively positioned thereat by a suitable sampling transport mechanism such as that illustrated comprising a pair of pivotably mounted plates 14 and 15 respectively having sampling trays 16 and 17. Each of the plates is automatically driven with a constant speed under specimen station aperture 13 providing for uniform conditions for the period during which reflectance measurements are performed.

In the present embodiment a suitable specimen delivery mechanism will provide a small representative sample, at a minimum cycle spacing of, for example, 10 seconds, from the powder product stream. The discrete sample representing a cross-section of the flowing material would be dropped onto the tray 17 in rotating plate 15, leveled and passed at a constant angular speed under the aperture specimen station for a period e.g., of ½ to 1 second. After several sample determinations, the number of which can be varied, the optical standard, e.g., barium sulfate, in standard tray 16 is rotated to similarly pass under the aperture specimen station 13.

A pair of fiber optic light guides 18 and 19 are coupled to the integrating sphere at apertures 21 and 22 respectively, defining light receiving stations located at two regions of the integrating sphere. Each of the fiber optic light guides 18 and 19 is trifurcated to provide three distinct light guide paths, one each of the three each coupled to photodetector units 23, 24 and 25. Each of the photodetector units includes an optical filter and photodetector, such as a multiplier phototube. The filters designed for monitoring reflectance values at wavelengths $\lambda_1$, $\lambda_2$ and $\lambda_3$ are positioned in front of photodetectors 23, 24 and 25 respectively. The output leads from photodetectors 23, 24 and 25 each provides an electrical signal representative of the diffusely reflected light collected by the integrated sphere from the sample/standard at the three wavelengths when the sample/standard tray passes under aperture specimen station 13.

The photodetectors 23, 24 and 25 are electrically connected to operational amplifiers 26, 27 and 28. The operational amplifiers are in turn severally coupled by a first path to analog divide units 29, 30 and 31 and coupled through a second path to another input of the same analog divide units by way of sample and hold units 32, 33 and 34 respectively. Each of the sample and hold units is conditioned to sample the output of its respective photodetector when position indicator 35, located adjacent the path traversed by plates 14, 15 senses that the standard tray 16 is passing under the aperture specimen station 13 which standard value is then stored in the respective sample and hold unit. Any suitable position indicating mechanism could be employed such as; a light emitting and receiving arrangement; a magnetic flux generating and sensing combination; etc.

The input to each of the sample and hold units preferably includes conventional circuitry that integrates the value of the standard during the period which the standard tray is under the aperture specimen station 13 in order to provide an average standard value for reference purposes.

Standardization of each of the three optical channels is accomplished by a ratio module such as the analog divide units (which might also be analog multiply units) to provide a ratio comparison of the sample specimen signal to the stored standard or reference signal from the sample and hold units. The outputs from the analog divide units 29, 31 and 32 are supplied to processing electronics 36 for processing the signals representing the diffuse reflectance of the sample at the different wavelengths.

Development of the processing circuitry 33 was based on the selection of certain relations of reflectance data at preselected wavelengths which obviates any problem concerning the effect of particle size distribution on the measurement of the sample properties, for example, particle diameters in the 10 to 100 micrometer range. The measurement indicator values derived were found to accurately reflect the physical properties of a specimen being analyzed on the basis of rigorous correlation with solution transmittance values for the same specimen. By normalizing the indicator values with known standard values a criterion of rejection could readily be established.

In the present case three indicator values designated as $\Delta_1$, $\Delta_2$ and $\Delta_3$ were derived, although $\Delta_1$ by itself could be sufficient. The first criterion $\Delta_1$ was derived by taking the difference in reflectance at $\lambda_3$ and $\lambda_1$. The net result of this difference can be practically seen by approximating the reflectance at $\lambda$ by a sum of two components through the following equation:

$$R_\lambda = \epsilon_\lambda (m,k) + \epsilon'_\lambda (\bar{D}) \quad \text{(I)}$$

which equation stems from an approximation which is slightly better than that given by a first order perturbation analysis arrived at from a Taylor expansion and holds for small changes in either of the terms where $\epsilon_\lambda(m,k)$ is a function only of the optical properties of the material and $\epsilon'_\lambda(\bar{D})$ is a function only of the particle size distribution in the powder sample. In this equation: $m$ is the refractive index of powder constituents; $k$ is the absorption index of powder constituents; and $\bar{D}$ is the number mean particle diameter. The first indicator value $\Delta_1$ is proportional to the difference in reflectance between $\lambda_3$ and $\lambda_1$; this may be expressed as $$\Delta_1 = k(R_{\lambda_3} - R_{\lambda_1}) \quad \text{(II)}$$

By substituting Equation (I) into equation (II) we have $$\Delta_1 = k[\epsilon_{\lambda_3}(m,k) - \epsilon_{\lambda_1}(m,k) + \epsilon'_{\lambda_1}(\bar{D}) - \epsilon'_{\lambda_3}(\bar{D})] \quad \text{(III)}$$

The last two terms, in the above Equation (III), express the difference between contributions to the reflectance at the two wavelengths caused only by changes in the particle size distribution. Obviously, for large changes in particle size (orders of magnitude) this term will be non-zero; however, for small changes in particle size distribution, e.g., diameters from 10 to 100 micrometers, each contribution, i.e., $\epsilon'_{\lambda_3}(\bar{D})$ and $\epsilon'_{\lambda_1}(\bar{D})$ increases monotonically with decreasing particle size at near equal rates, thereby leaving us with $$\Delta_1 = k[\epsilon_{\lambda_3}(m,k) - \epsilon_{\lambda_1}(m,k)] \quad \text{(IV)}$$

representing a function only of the optical properties of the solid powder at two wavelengths $\lambda_1$ and $\lambda_3$. Indicator value $\Delta_1$ has been found to be sensitive to changes in optical properties of the powder in the near ultraviolet where the absorption band of an impurity is known to occur.

Along the same lines discussed above, the second indicator value $\Delta_2$ was set up as follows:

$$\Delta_2 = k[R_{\lambda_3} - (R_{\lambda_1} + R_{\lambda_2}/2)] \quad \text{(V)}$$

where by adding $\lambda_1$ and $\lambda_2$ and dividing by two provides for an average reflectance in the blue region as again this is an area of the spectrum where an interest lies for ascertaining impurities. The derived indicator value $\Delta_2$ is used in the same manner as $\Delta_1$ in analyzing the optical properties of a powder for small changes in particle size distribution as discussed above.

If desired, it has been found that an additional indicator value $\Delta_3$ may be useful to account for the overall reflectance of the powder product in the visible region. This latter criterion might be defined as:

$$\Delta_3 = k(R_{\lambda_1} + R_{\lambda_2} + R_{\lambda_3}/3) \quad \text{(VI)}$$

which is an average of the overall visible reflectance. It should be noted that $\Delta_3$ is sensitive to particle size.

Indicator value $\Delta_1$ correlated best with comparison data collected on solution transmittance and accordingly could be solely employed as an indicator value for impurity determination or detection. Indicator value $\Delta_2$ was also found to correlate well and may be employed as shown in the preferred embodiment to supplement the indicator value $\Delta_1$. Indicator value $\Delta_3$ is used as a supplemental indicator of average visible reflectance.

Figure 2:
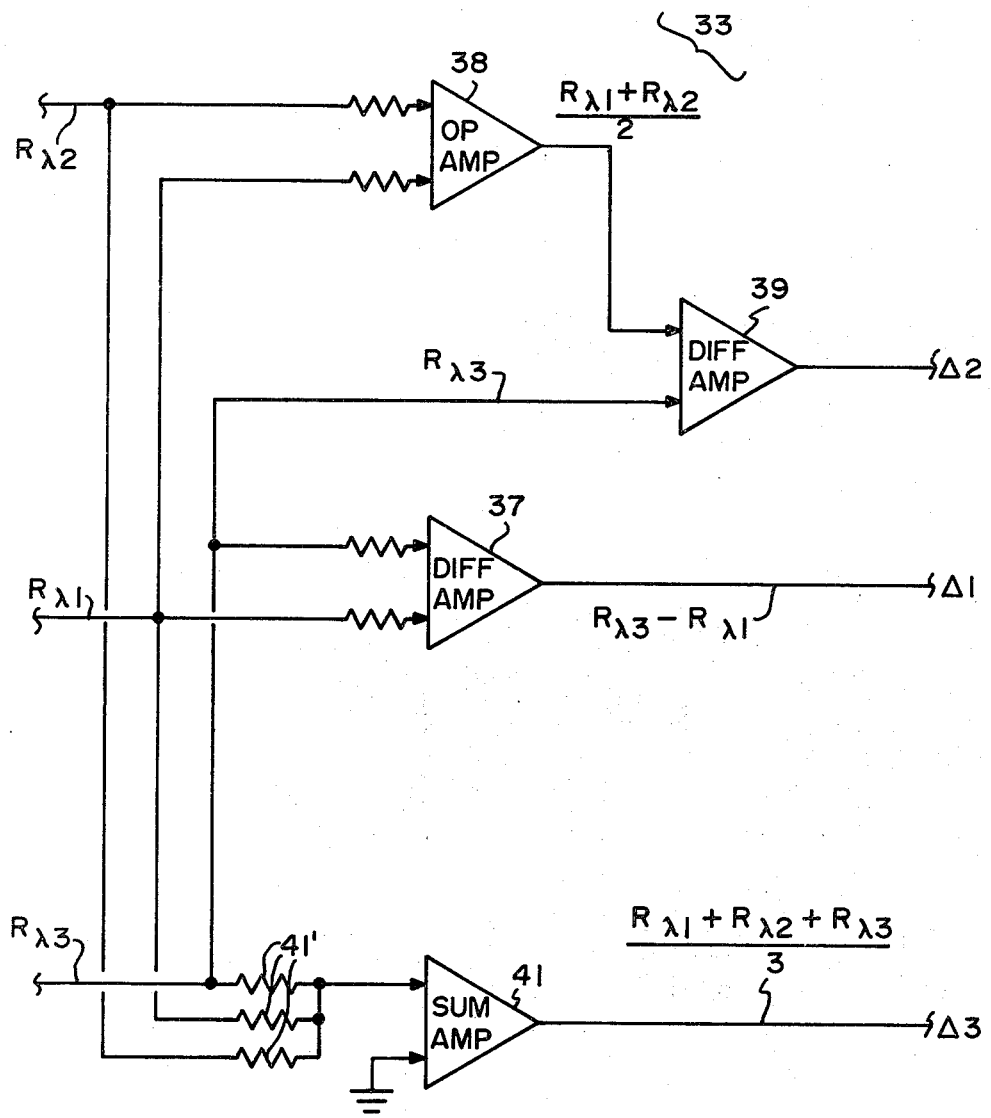
FIG. 2 is a detailed schematic logic diagram of the processing electronics 36 shown in FIG. 1.

With reference to FIG. 2 there is shown analog circuitry embodying the processing electronics 33 for deriving the indicator values $\Delta_1$, $\Delta_2$ and $\Delta_3$ discussed above. Differential amplifier 37 is connected from analog divide units 31 and 32 carrying reflectance information representative of $\lambda_1$ and $\lambda_3$ respectively, to provide at the output of differential amplifier 37 the indicator value $\Delta_1$. The operational amplifier 38 is connected from analog divide units 29 and 31 to provide an output indicative of one-half of the summation of the electrical reflectance values $R_{\lambda_1}$ and $R_{\lambda_2}$. The outputs of operational amplifier 38 and differential amplifier 37 are coupled to a second differential amplifier 38 which takes the difference of these values to provide the indicator value defined as $\Delta_2$. At the same time the electrical reflectance values at $\lambda_1$, $\lambda_2$ and $\lambda_3$ are fed via resistors 41' to a summing amplifier 41 which takes the average of these values to define the third indicator value $\Delta_3$.

OPERATION

In operation, to automatically accomplish a colorimetric determination of ascorbic acid quality, first, standardization is effected by rotation of plate 14 to position the barium sulfate of reflectance standard tray 16 under the specimen station slit 13. The reflectance values from the standard received within integrating sphere 11 are derived from light collected at apertures 21, 22 and fed to photodetector units 23, 24 and 25 where the light energy is converted to electrical signals which are supplied to operational amplifiers 26, 27 and 28 and in turn to the sample and hold units 32, 33 and 34 respectively which are conditioned by a suitable pulse from position indicator 35 for sampling and storing the signals indicative of the barium sulfate standard.

Thereafter, as plate 15 is rotated to place the sample tray 17 under specimen station aperture 13 the reflected light intensity signals are generated by the photodetector units and operational amplifiers and passed to the analog divide units 29, 31 and 32 where the signals are standardized by effecting an updated reflectance ratio comparison of the sample signal to the stored standard signal. The standardized signals then representing the diffuse reflectance of the sample at the three wavelengths are fed to the processing electronics 36 having analog circuitry to effect derivation of the indicator values $\Delta_1$, $\Delta_2$ and $\Delta_3$ in accordance with Equations II, V and VI set out above.

Specifically, $\Delta_1$ which is derived by subtracting the reflectance values at $\lambda_3$ and $\lambda_1$ is accomplished by difference amplifier 37. The indicator value $\Delta_1$ is relatively insensitive to changes in particle size distribution varying from 10 to 100 $\mu$m and sensitive to produce impurities in the ultraviolet reflectance spectrum. The second indicator value $\Delta_2$ is derived by taking the average value of reflectance voltage values in the ultraviolet and blue spectrum at $\lambda_1$ and $\lambda_2$, with operational amplifier 38 and subtracting it from the reflectance value at $\lambda_3$, to provide another indication of product impurities. For example, upon detection of lower reflectance by the optical assembly $\Delta_2$ is found to be relatively larger, then yellowness of the product is indicated. On the other hand, a low value of $\Delta_2$ which represents differences between the red and blue regions would be indicative of the absence of yellowness. The criteria $\Delta_3$ which is optional provides an indication of overall visible reflectance and will be indicative of the whiteness of the product. The falling off of reflectance values which provides a low value of $\Delta_3$ will denote presence of gray or black and thus absence of a white characteristic to indicate the need for closer scrutiny of the product and perhaps rejection or other suitable action.

I claim:

1. A method for determining the optical properties of a granular crystalline powder sample by measuring the reflectance of said granular crystalline powder sample in a solid state relative to the reflectance of a reference whereby the effect of the powder particle size on such determination is minimized comprising:

deriving electrical signals indicative of sample and reference specimen reflectance at first and second wavelength regions which are respectively sensitive and insensitive to a change in the sample optical properties to be determined;

effecting a ratio-comparison of the sample signal to the reference signal at each of the wavelengths to provide distinct standardized signals; and generating an output indicator signal comprising the difference in standardized signals at first and second wavelength regions which is representative of the sample's optical properties unaffected by particle size.

2. A method for analyzing visible reflectance data of a granular crystalline powder sample in a solid state relative to reference reflectance data for minimizing the effects of the powder particle size on measurement of the sample optical properties comprising:

deriving electrical signals indicative of sample and reference specimen reflectance data for a first, second and third wavelength regions, the first and third sensitive to and the second insensitive to the sample optical quality to be monitored;

effecting a ratio comparison of the sample signal to the reference signal at each of the wavelengths to provide distinct standardized signals; and, relating the standardized signals to each other by first averaging the standardized signals of the first and third wavelength regions, and then detecting the difference between the standardized signal at the second wavelength and said averaged standardized signals to provide a first indicator signal.

3. A method according to claim 2 whereby said relating the standardized signals includes detecting the difference between the standardized signals at the first and second wavelength regions to provide a second indicator signal.

4. A method according to claim 3 including averaging the standardized signals at the first, second and third wavelength regions to provide a third indicator signal.

5. Apparatus for determining the optical properties of a granular crystalline powder sample by measuring the reflectance of said granular crystalline powder sample in a solid state relative to the reflectance of a reference whereby the effect of the powder particle size on such determination is minimized comprising:

optical assembly means for deriving electrical signals indicative of sample and reference specimen reflectance at first and second wavelength regions which are respectively sensitive and insensitive to a change in the sample optical properties to be determined;

means for effecting a ratio comparison of the sample signal to the reference signal at each of the wavelengths to provide distinct standardized signals; and logic means for generating an output indicator signal comprising the difference in standardized signals at first and second wavelength regions which is representative of the sample optical properties unaffected by particle size.

6. Apparatus for determining the optical properties of a granular crystalline powder sample by measuring the reflectance of said granular crystalline powder sample in a solid state relative to the reflectance of a reference whereby the effect of the powder particle size on such determination is minimized comprising:

optical assembly means for deriving electrical signals indicative of sample and reference specimen reflectance at first, second and third wavelength regions the first and third sensitive to and the second insensitive to a change in the sample optical properties to be determined;

means for effecting a ratio comparison of the sample signal to the reference signal at each of the wavelengths to provide distinct standardized signals; and, logic means which comprises means for generating a first output indicator signal comprising the difference in standardized signals at first and second wavelength regions which is representative of the sample's optical properties unaffected by particle size, means for averaging the standardized signals at the first and third wavelength regions, means for generating a second output indicator signal which comprises the difference between the standardized signal at the second wavelength region and said averaged standardized signals which are also representative of the sample's optical properties unaffected by particle size.

7. Apparatus according to claim 6 whereby said logic means further includes means for averaging the standardized signals at the first, second and third wavelength regions to provide a third indicator signal representative of the sample optical properties.

* * * * *